(12) United States Patent
Richter

(10) Patent No.: US 10,634,008 B2
(45) Date of Patent: Apr. 28, 2020

(54) METHOD FOR MANUFACTURING A HOUSING OF A TURBOMACHINE AND TURBOMACHINE HOUSING

(71) Applicant: MTU Aero Engines AG, Munich (DE)

(72) Inventor: Karl-Hermann Richter, Markt Indersdorf (DE)

(73) Assignee: MTU Aero Engines AG, Munich (DE)

( * ) Notice: Subject to any disclaimer, the term of this patent is extended or adjusted under 35 U.S.C. 154(b) by 418 days.

(21) Appl. No.: 15/455,534

(22) Filed: Mar. 10, 2017

(65) Prior Publication Data

US 2017/0276023 A1 Sep. 28, 2017

(30) Foreign Application Priority Data

Mar. 22, 2016 (DE) .................. 10 2016 204 660

(51) Int. Cl.
*F01D 25/24* (2006.01)
*B33Y 10/00* (2015.01)
(Continued)

(52) U.S. Cl.
CPC .......... *F01D 25/24* (2013.01); *B23K 15/0046* (2013.01); *B23K 26/21* (2015.10); *B23K 26/38* (2013.01); *B33Y 10/00* (2014.12); *B33Y 80/00* (2014.12); *B22F 3/1055* (2013.01); *B22F 5/009* (2013.01); *B22F 7/062* (2013.01);
(Continued)

(58) Field of Classification Search
CPC .. Y10T 29/49865; B22F 3/1055; B22F 5/009; B22F 7/062; B23K 26/21; B23K 26/38; B23K 2101/001; B33Y 10/00; B33Y 80/00; F01D 25/24; F05D 2220/32;
(Continued)

(56) References Cited

U.S. PATENT DOCUMENTS 3,768,147 A * 10/1973 Berry ................. B23P 15/04
228/112.1
4,825,642 A * 5/1989 Radtke .................. F01D 21/003
415/118
(Continued)

FOREIGN PATENT DOCUMENTS

DE 1428223 A1 7/1969
DE 2947355 A1 6/1980
(Continued)

OTHER PUBLICATIONS

Goover, Fundamentals of Modern Manufacturing, 4th ed. John Wiley & Sons, 2010. pp. 67-69 (Year: 2010).*
(Continued)

*Primary Examiner* — Jacob J Cigna
(74) *Attorney, Agent, or Firm* — Barlow, Josephs & Homes, Ltd.

(57) ABSTRACT

The invention relates to a method for manufacturing a housing of a turbomachine, in particular a gas turbine. The method comprises at least the steps: providing a housing blank, manufacturing a housing element, producing an assembly opening corresponding to the housing element in the housing blank, arranging the housing element in the assembly opening, and joining the housing element to the housing blank by means of a welding method. In addition, the invention relates to a turbomachine housing.

13 Claims, 4 Drawing Sheets

(51) Int. Cl.
| | |
|---|---|
| *B33Y 80/00* | (2015.01) |
| *B23K 26/21* | (2014.01) |
| *B23K 15/00* | (2006.01) |
| *B23K 26/38* | (2014.01) |
| *B23K 101/00* | (2006.01) |
| *B22F 7/08* | (2006.01) |
| *B22F 3/105* | (2006.01) |
| *B22F 7/06* | (2006.01) |
| *B22F 5/00* | (2006.01) |

(52) U.S. Cl.
CPC .......... *B22F 7/08* (2013.01); *B23K 2101/001* (2018.08); *F05D 2220/32* (2013.01); *F05D 2230/11* (2013.01); *F05D 2230/13* (2013.01); *F05D 2230/232* (2013.01); *F05D 2230/233* (2013.01); *F05D 2230/234* (2013.01); *F05D 2230/50* (2013.01); *Y02P 10/295* (2015.11)

(58) Field of Classification Search
CPC .......... F05D 2230/11; F05D 2230/13; F05D 2230/232–234; F05D 2230/50
See application file for complete search history.

(56) References Cited

U.S. PATENT DOCUMENTS

| | | | | |
|---|---|---|---|---|
| 5,085,363 | A * | 2/1992 | Sims | B23K 9/046 228/119 |
| 5,501,071 | A * | 3/1996 | Ansart | F02K 1/822 60/800 |
| 6,779,708 | B2 * | 8/2004 | Slattery | B23K 20/1205 228/112.1 |
| 7,024,863 | B2 * | 4/2006 | Morenko | F23R 3/50 60/752 |
| 8,763,248 | B2 * | 7/2014 | Carrier | B23K 20/129 29/889.2 |
| 9,249,732 | B2 * | 2/2016 | McAlice | F02K 1/82 |
| 2006/0010852 | A1 | 1/2006 | Gekht et al. | |
| 2006/0026966 | A1 * | 2/2006 | Moraes | F23R 3/283 60/796 |
| 2006/0096091 | A1 * | 5/2006 | Carrier | B23K 20/129 29/889.2 |
| 2008/0160337 | A1 * | 7/2008 | Clark | B23K 1/0018 428/615 |
| 2009/0229101 | A1 * | 9/2009 | Ahmad | B23K 1/0018 29/402.18 |
| 2009/0293253 | A1 * | 12/2009 | Walker | B23P 6/005 29/402.13 |
| 2010/0077587 | A1 * | 4/2010 | Peters | B23K 20/129 29/402.01 |
| 2011/0110783 | A1 * | 5/2011 | Addis | B23P 6/005 416/219 R |
| 2011/0264413 | A1 | 10/2011 | Stankowski et al. | |
| 2013/0064653 | A1 * | 3/2013 | Carrier | B23K 20/129 415/182.1 |
| 2013/0224012 | A1 | 8/2013 | Durocher et al. | |
| 2015/0040393 | A1 | 2/2015 | Shteyman et al. | |
| 2016/0160863 | A1 * | 6/2016 | Roach | B32B 27/281 415/119 |
| 2017/0182606 | A1 * | 6/2017 | Nishida | B23K 9/007 |
| 2017/0198592 | A1 * | 7/2017 | Colletti | B23K 26/38 |
| 2018/0030899 | A1 * | 2/2018 | Kamoi | F02C 7/266 |

FOREIGN PATENT DOCUMENTS

| | | |
|---|---|---|
| DE | 60114748 T2 | 7/2006 |
| DE | 60126481 T2 | 10/2007 |
| DE | 102008019156 A1 | 10/2009 |
| DE | 102013224982 A1 | 6/2015 |
| DE | 102008012064 B4 | 7/2015 |
| DE | 102014204468 A1 | 10/2015 |
| EP | 1653054 A1 | 10/2005 |
| EP | 1607158 A1 | 12/2005 |
| GB | 1013342 A | 12/1965 |
| WO | 2012170188 A2 | 12/2012 |

OTHER PUBLICATIONS

Zhu, Zicheng; Dhokia, Vimal; Nassehi, Aydin; Newman, Stephen T., "Investigation of part distortions as a result of hybrid manufacturing", Elsevier, Robotics and Computer-Integrated Manufacturing 37 (2016) 23-32.
"Hybridmaschine kombinieren additive and spanende Fertigung", MM MaschinenMart, Maschinenmarkt KW11 2015.
"Hybrid Manufacturing", Compendex Copyright 2015 EEI.
Manufacturing Engineering, Apr. 2014 vol. 152, No. 4, manufacturingengineeringmedia.com.
Europaischer Laser Markt, Branchenfuhre 2015.

* cited by examiner

METHOD FOR MANUFACTURING A HOUSING OF A TURBOMACHINE AND TURBOMACHINE HOUSING

BACKGROUND OF THE INVENTION

The invention relates to a method for manufacturing a housing of a turbomachine as well as a turbomachine housing.

Turbomachine housings, for example, engine housings of aircraft engines are usually provided with different housing elements. Examples of such housing elements are bosses, flanges for through-guides and borescopes, rails, local thickened areas and struts, in order to locally improve the strength properties of the housing. These housing elements are manufactured by machining a housing blank.

Viewed as a disadvantage of fabrication by machining is the circumstance that comparatively large machining allowances are required and a correspondingly high expenditure for machining is necessary.

SUMMARY OF THE INVENTION

The object of the present invention is to specify a method which makes possible a more rapid and more cost-effective manufacture of a housing of a turbomachine. Another object of the invention is to specify a housing that can be manufactured in a correspondingly more rapid and more cost-effective manner.

These objects are achieved according to the invention by a method and housing of the present invention. Advantageous embodiments with appropriate enhancements of the invention are set forth in detail below, wherein advantageous configurations of the method are to be viewed as advantageous embodiments of the housing, and vice versa.

A first aspect of the invention relates to a method for manufacturing a housing of a turbomachine, particularly of a gas turbine. In this case, according to the invention, at least the following steps are conducted: providing a housing blank, manufacturing a housing element, producing an assembly opening corresponding to the housing element in the housing blank, arranging the housing element in the assembly opening, and joining the housing element to the housing blank by means of a welding method. Therefore, unlike the prior art, it is no longer necessary to manufacture the housing blank with a large machining allowance and to process by machining in complex manner. This makes possible considerable savings in cost and time, as well as minimizing the costs of the blank. Additionally, it is possible to manufacture the one or more housing elements independently of fabrication sequences on the housing blank. In the simplest embodiment of the invention, the housing produced in this way no longer requires additional mechanical post-processing steps; rather, at most it requires a heat treatment. In particular, separating steps such as cutting or the like are usually no longer necessary. The housing element can be welded basically to the housing blank with or without a welding filler. The use of a welding filler generally permits greater tolerances.

In an advantageous embodiment of the invention, it is provided that a housing blank with an at least substantially rotationally symmetrical, particularly cylindrical or conical geometry is provided. As used throughout herein, the expression "substantially rotationally symmetrical" in general means the shape of a rotationally symmetrical body designed around an axis of rotation, wherein the axis of rotation is preferably disposed coaxially with an axis of rotation of a rotor of an assigned turbomachine. Correspondingly, "substantially cylindrical" in general means having the shape of a cylinder, either with or without a specific contour. Analogously, "substantially conical" in general means having the shape of a cone or taper, either with or without a specific contour. In this case, it can also be provided that the housing blank has several segments, each of which are designed at least substantially cylindrical or conical. The housing blank is usually hollow on the inside.

Additional advantages result by manufacturing the housing element by means of at least one method from the group: machining, electrochemical machining (ECM), and additive manufacturing methods, in particular laser beam melting and/or electron beam melting. The at least one housing element can be manufactured particularly rapidly and economically as a function of its respective geometry and functionality.

Additional advantages result if the housing element is manufactured on and/or with a platform being arranged in the assembly opening, whereby the platform preferably has a wall thickness corresponding to the wall thickness of the housing blank. The housing element can be joined particularly rapidly, simply and precisely to the housing blank thereby, since the platform already has the geometry adapting to the assembly opening, and preferably also has a wall thickness corresponding to the housing blank. In addition to this, it is possible to manufacture different housing elements on and/or with standardized or individually adapted platform types. This permits the introduction of correspondingly standardized assembly openings into the housing blank, whereby the assembly openings, for example, can be adapted to a specific housing element functionality in order to ensure a secure assembly that cannot be changed.

In another advantageous embodiment of the invention, an assembly opening with an at least substantially circular or oval or polygonal, in particular rectangular, geometry is produced in the housing blank. In other words, it is provided that one or more assembly openings are produced with a geometry that is as simple as possible. This also makes possible considerable advantages relative to time and cost, both in the production of the assembly opening(s) as well as in the arrangement and attachment of the one or more housing elements. In addition to this, an unnecessary weakening of the housing blank is avoided. In the case of an angular geometry, it can be basically provided that one, several, or all corners are or will be rounded.

In another advantageous embodiment of the invention, the housing element is aligned relative to the assembly opening when it is arranged by means of at least one centering element. This ensures a failproof arrangement (failproof design) of the housing element. The centering element can be, for example, a centering lip that is formed on the housing element and/or the assembly opening, and this lip cooperates with a corresponding groove, recess, notch, or the like when the housing element is arranged, so that the housing element can only be inserted into the assembly opening in the correct, three-dimensional alignment.

In another advantageous embodiment of the invention, it is provided that the assembly opening is produced by means of at least one separating method, in particular, from the group: eroding, milling and laser beam cutting. This permits introducing the assembly opening(s) into the housing blank rapidly, precisely, and correctly as required.

Additional advantages result by heating the housing blank prior to arranging the housing element in the assembly opening, and subsequently shrink fitting the housing element into the assembly opening. In this way, a force-fit connection is produced, whereby the housing element is particularly simply joined and can resist especially high mechanical and thermal loads.

A particularly rapid and precise joining of the housing element with minimum input of heat into the housing blank is achieved in another embodiment of the invention by attaching the housing element to the housing blank by means of at least one welding method from the group: electron beam welding and laser beam welding.

In order to be able to optimally adapt the housing to its respective purpose of application, in another embodiment of the invention, it has proven to be advantageous if the housing element is manufactured with at least one structural element from the group: flange, rail, boss, local thickened area, shoulder, through-guide, and/or strut.

In another advantageous embodiment of the invention, it is provided that the housing blank is thermally expanded, after which at least one rail is arranged in the housing blank and is shrunk fit, and/or that a flange is thermally expanded, after which the flange is arranged on the housing blank and is shrunk fit on the housing blank. Both rails (inner flanges) as well as outer flanges can be joined thereby in a force fit to the housing blank, whereby they can be loaded particularly greatly mechanically and thermally.

In another advantageous embodiment of the invention, at least one stop piece is manufactured on the housing blank, by means of which the rail and/or the flange is/are aligned relative to the housing blank. This permits a particularly precise and failproof alignment of the rail and/or of the flange on/in the housing blank.

In another embodiment of the invention, it is provided that the stop piece is manufactured by means of a separating method, in particular by milling, and/or is joined to the housing blank by a joining method, in particular by welding and/or adhesive bonding. This permits forming or fastening the stop optimally as a function of the respective structural specificities. In the case of a separating method, a corresponding machining allowance of the housing blank is necessary, so that the stop piece can be manufactured, for example, by peripheral or local milling technique. It is likewise possible to join local stop pieces or seating elements to the housing blank by a joining technique. In particular, cohesive methods such as spot welding, adhesive bonding, etc. are advantageous as joining methods.

A particularly reliable connection is achieved in another embodiment of the invention by welding the rail and/or the flange to the housing blank, in particular by means of a peripheral weld and/or a fillet weld and/or an I-butt and/or an I-seam.

A second aspect of the invention relates to a turbomachine housing, particularly a gas turbine, wherein the housing can be manufactured in a more rapid and cost-effective manner, in that it comprises a housing blank, on or in which a housing element is fastened in a corresponding assembly opening in the housing blank and is welded to the housing blank. Therefore, unlike the prior art, it is provided that the housing element is not produced directly from the housing blank, but is first manufactured separately from the housing blank and after this is arranged in an assembly opening produced in the housing blank and joined to the housing blank by welding. This makes possible considerable savings in cost and time, as well as minimizing the costs of the blank, since the one or more housing elements can be manufactured on or in the housing blank independently from the fabrication sequence. In the simplest embodiment of the invention, the housing produced in this way no longer requires additional mechanical post-processing steps; rather, at most it requires a heat treatment. In particular, separating steps such as cutting or the like are usually no longer necessary. Preferably, the housing can be obtained and/or is obtained by means of a method according to the first aspect of the invention, wherein advantageous embodiments of the first aspect of the invention are to be viewed as advantageous embodiments of the second aspect of the invention, and vice versa.

BRIEF DESCRIPTION OF THE DRAWING FIGURES

Further features of the invention result from the claims and the examples of embodiment. The features and combinations of features named above in the description, as well as the features and combinations of features named in the examples of embodiment below and/or shown alone can be used not only in the combination indicated in each case, but also in other combinations or uniquely, without departing from the scope of the invention. Thus, embodiments of the invention that are not explicitly shown and explained in the embodiment examples, but proceed from the explained embodiments and can be produced by separate combination of features, are also to be viewed as comprised and disclosed. Embodiments and combination of features that thus do not have all features of an originally formulated independent claim are also to be viewed as disclosed. Herein:

DESCRIPTION OF THE INVENTION

Figure 1:
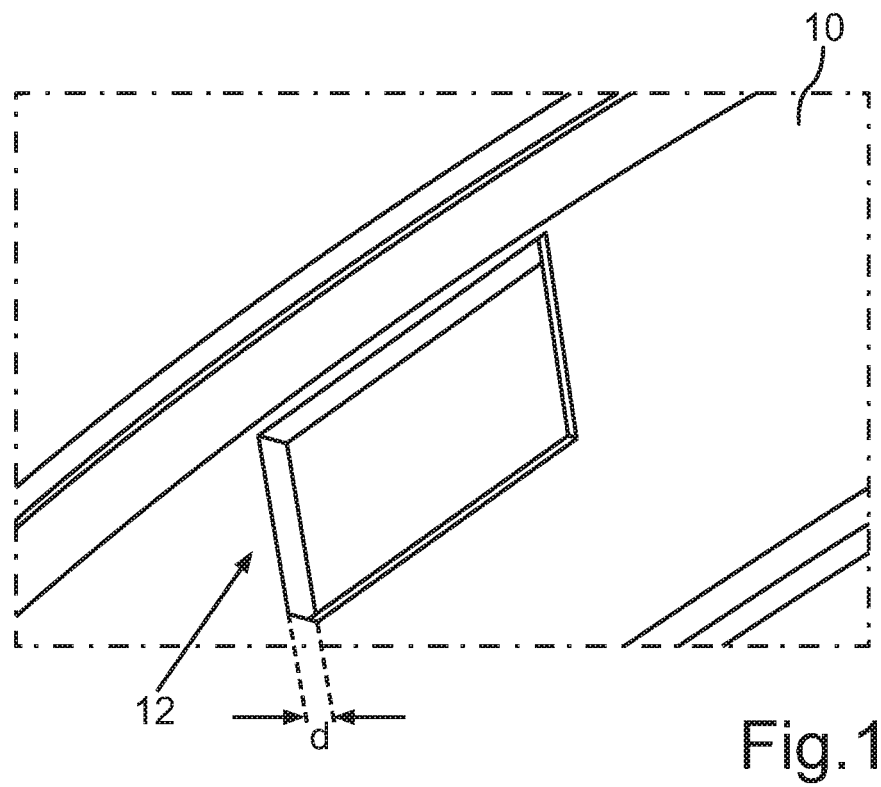
FIG. 1 shows a schematic perspective view of a housing blank with an assembly opening.
Figure 2:
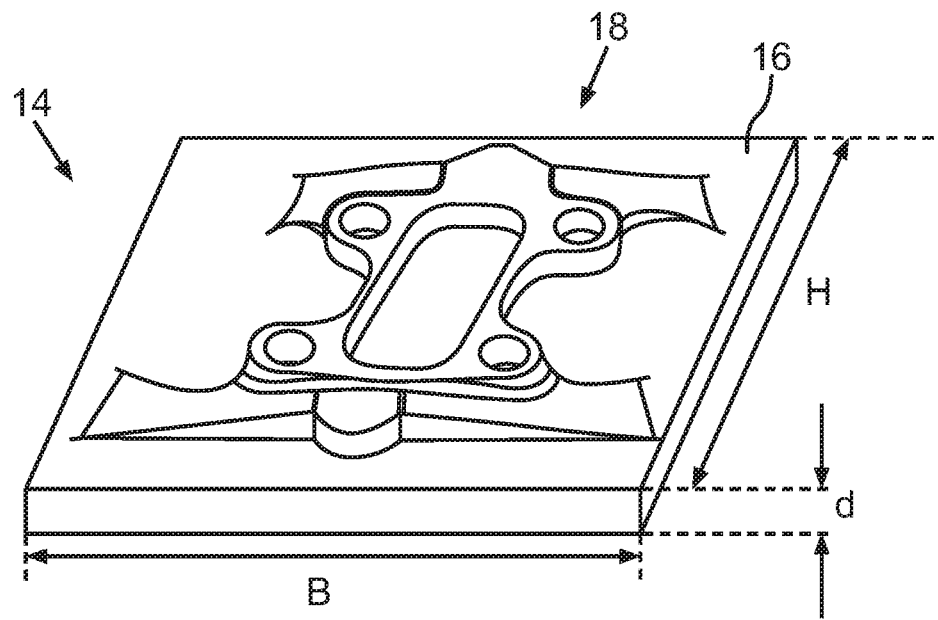
FIG. 2 shows a schematic perspective view of a housing element.

FIG. 1 shows a schematic perspective view of a housing blank 10 of a gas turbine. It is recognized that the housing blank 10 is formed at least substantially rotationally symmetrical or cylindrical. An assembly opening 12 that corresponds to a housing element 14, which is shown schematically in FIG. 2, is produced in the housing blank 10. For this purpose, the housing element 14 comprises a platform 16, the dimensions of which (height H, width B, thickness d) correspond to those of the assembly opening 12. In particular, the thickness d of the platform 16 corresponds to the wall thickness d of the housing blank 10. The assembly opening 12 has a geometry that is as simple as possible (optionally with rounded edges); for example, it is circular or rectangular. The assembly opening 12 can be manufactured with the aid of a cutting method; thus, for example, by eroding, milling, or laser beam cutting.

In addition, the housing element 14 comprises local design features or structural elements 18, which are formed on the platform 16. Structural elements 18 can comprise, for example, flanges, local thickened areas, shoulders, through-guides, and/or struts, in order to provide the housing blank 10 with specific properties, connection points, or the like. The housing element 14 thus can be manufactured separately, independently from the fabrication of the housing blank 10, for example, by machining, ECM, or by additive manufacture. The platform 16 can be provided as the base for building up the structural element 18 or it can be manufactured together with the structural element 18, depending on the manufacturing method. In the case of an additive manufacture, laser beam melting or electron beam melting is preferably used, in order realize a so-called near net shape geometry, i.e., a geometry that is close to the final contours and requires no additional processing.

Figure 3:
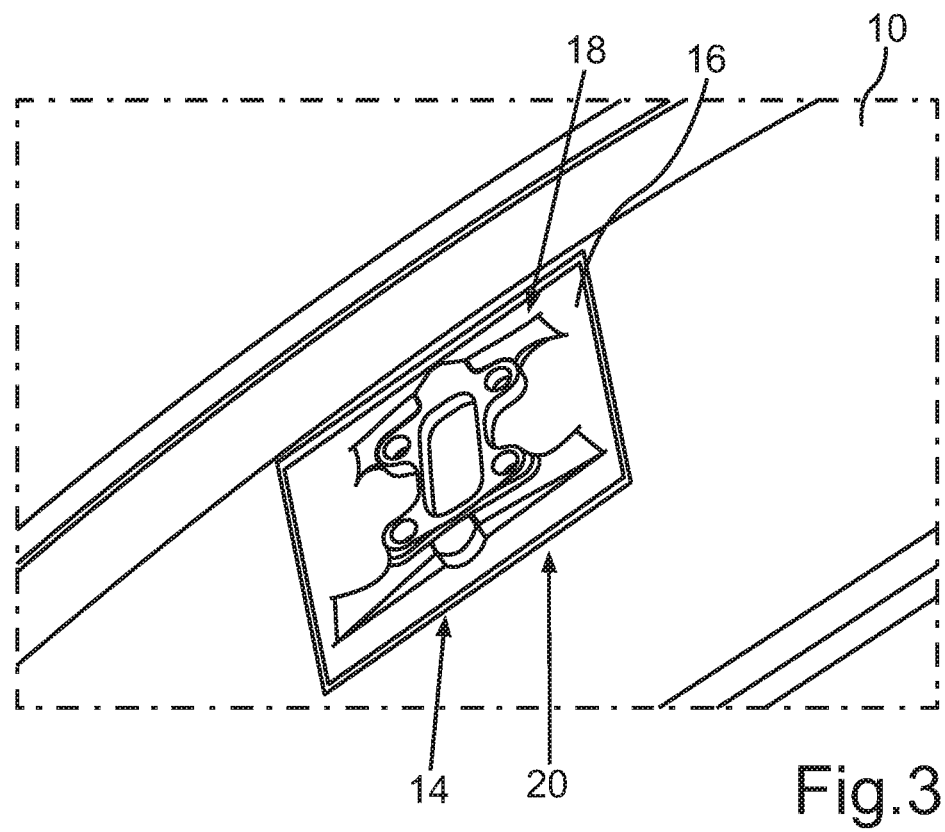
FIG. 3 shows a schematic perspective view of the housing blank, in which the housing element is arranged in the assembly opening and is welded to the housing blank.

FIG. 3 shows a schematic perspective view of the housing blank 10, in which the housing element 14 is arranged in the assembly opening 12 and is welded to the housing blank 10 with the formation of a peripheral weld 20. This is preferably conducted by electron beam welding or laser beam welding. The advantages of this manufacturing method, in addition to minimizing the costs of the blank, in particular include a reduction in fabricating time, since the design features 18 can be manufactured on the housing blank 10 independently from the fabrication sequence. Also, when joining the housing element 14 there is a much smaller introduction of heat into the housing blank 10, so that a delay is advantageously avoided for the housing blank 10. In addition, it can be provided that the housing element 14 and the housing blank 10 have centering elements corresponding to one another (e.g., a centering lip), in order to ensure a correct three-dimensional arrangement relative to one another ("failproof design"). Likewise, it can be provided that the housing element 14 is shrunk fit into the assembly opening 12. For this purpose, the housing blank 10 is first heated to around a specific temperature ΔT before the housing element 14 is arranged in the assembly opening 12. Upon cooling, a force-fit connection results between the housing blank 10 and the housing element 14.

Figure 4:
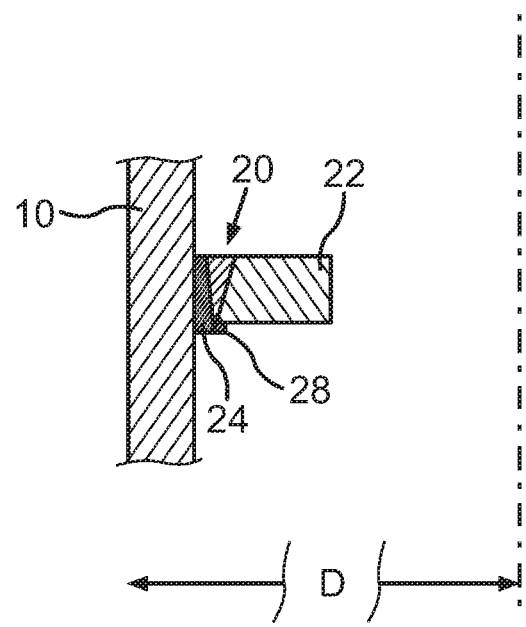
FIG. 4 shows a schematic lateral sectional view of a region of the housing blank, in which a rail is welded to the housing blank.

FIG. 4 shows a schematic lateral sectional view of a region of the housing blank 10, in which an annular rail 22, i.e., an internal flange, is welded peripherally to the housing blank 10, with the formation of a weld 20 executed as an I-seam. For welding the rail 22 or a flange 26 executed, it is in fact generally possible, but usually not necessary, to use welding fillers. Prior to welding, the rail 22 is aligned by means of a stop piece 24 provided with a centering lip 28, opposite the housing blank 10. The stop piece 24 can be manufactured, for example, peripherally by a milling technique, wherein this requires, if need be, a small machining allowance of the housing contour. It is likewise possible to join the stop piece 24 to the housing blank 10 by means of a joining technique. Spot welding, adhesive bonding, etc. are conceivable as joining methods.

Figure 5:
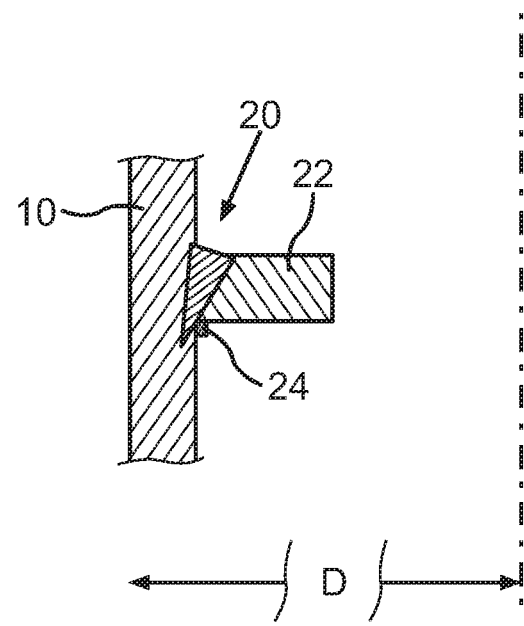
FIG. 5 shows a schematic lateral sectional view of a region of the housing blank, in which a rail is welded to the housing blank in an alternative manner.

FIG. 5 shows a schematic lateral sectional view of a region of the housing blank 10, in which an annular rail 22 is welded peripherally to the housing blank 10, with the formation of a fillet weld 20. Prior to welding, the rail is aligned again opposite the housing blank 10 by means of a stop piece 24. The stop piece 24 can also be manufactured peripherally by a milling technique, whereby this may require a small machining allowance of a few tenths of a millimeter for the housing contour. Likewise, it is also possible in this case, of course, to join local seating elements to the housing blank 10 by a joining technique. Spot welding, adhesive bonding, etc. are conceivable as joining methods. Additionally, it can be provided to shrink fit the rail 22 in the housing blank 10 prior to welding. For this purpose, the housing blank 10 is heated first in an oven to a temperature ΔT according to the formula (I)

$$\Delta T = \Delta D / (\alpha * D) \quad (I)$$

in which
ΔT: temperature increase
α: thermal expansion coefficient
D: diameter of the housing blank 10
ΔD: difference in the diameters of housing blank 10 and rail 22.

If the housing blank 10 and the rail 22, for example, are composed of the material IN718 with $\alpha \approx 1.2 * 10^{-5}$ K$^{-1}$, for D=1 m and ΔD=5/10 mm, a temperature increase ΔT≈40 K is necessary. It is generally preferred if the rail 22 is composed of a highly heat-resistant material, since high temperatures occur in this region during the operation of the finished turbomachine. The use of a highly heat-resistant material thus particularly prevents the occurrence of cracks and other wear phenomena (fretting). In addition, it can be provided that the rail 22 and the housing blank 10 have mutually corresponding centering elements (e.g., a centering lip 28) in order to ensure a correct three-dimensional arrangement relative to one another ("failproof design"). Several rails 22 can be manufactured by repeatedly applying the above-described procedure in one direction (i.e., from "bottom to top" or from "top to bottom").

Figure 6:
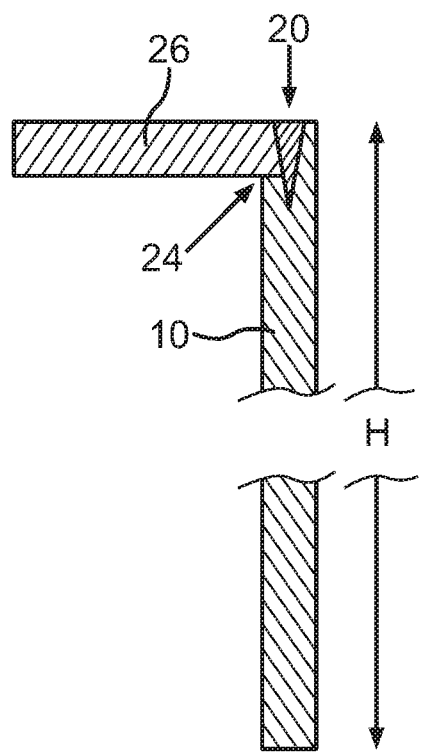
FIG. 6 shows a schematic lateral sectional view of a region of the housing blank, on which a flange is welded to the housing blank.

FIG. 6 shows a schematic lateral sectional view of a region of the housing blank 10, in which a flange 26 is welded to the housing blank 10. For this purpose, first a stop piece 24 is manufactured on the upper edge of the housing blank 10 by milling a peripheral groove. Subsequently, the annular flange 26 is positioned on the housing blank 10 and welded to the latter. In the present example of embodiment, this is carried out by means of another peripheral weld 20 formed as an I-butt. It can be basically provided that the flange 26 and the housing blank 10 have mutually corresponding centering elements (e.g., "centering lip") in order to ensure a correct three-dimensional arrangement relative to one another ("failproof design"). Additionally, it can be provided that the flange 26 is heated prior to arranging on the housing blank 10 and is shrunk fit on the housing blank 10. Formula (I) above can be drawn on to determine the temperature increase ΔT necessary for this.

Figure 7:
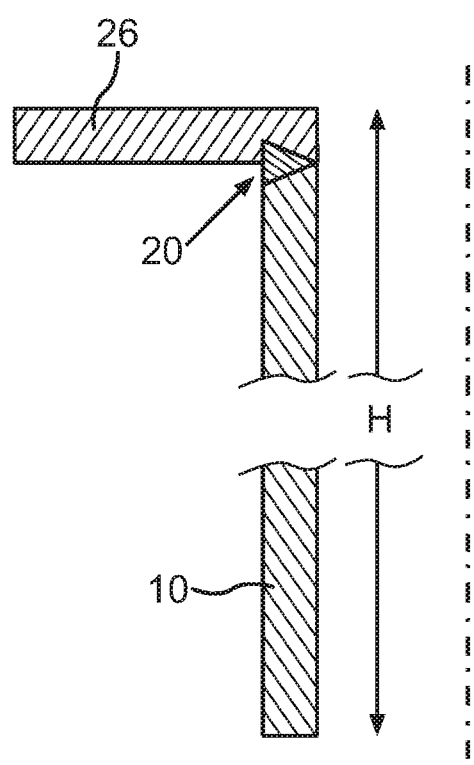
FIG. 7 shows a schematic lateral sectional view of a region of the housing blank, on which an alternative flange is arranged and welded to the housing blank.

FIG. 7 shows a schematic lateral sectional view of a region of the housing blank 10, on which an alternative flange 26 is arranged and welded to the housing blank 10. Unlike the previous exemplary embodiment, the housing blank 10 does not comprise a stop piece 24. The annular flange 26 is thus arranged only on the housing blank 10 and welded to the latter by means of a fillet weld 20. Optionally, it can be provided that the flange 26 and the housing blank 10 have mutually corresponding centering elements (e.g., "centering lip") in order to ensure a correct three-dimensional arrangement relative to one another ("failproof design").

What is claimed is:

1. A method for manufacturing a housing of a turbomachine, comprising the steps of:
    providing a housing blank;
    manufacturing a housing element;
    producing an assembly opening corresponding to the housing element in the housing blank;
    heating the housing blank prior to a temperature (ΔT), arranging the housing element in the assembly opening and shrink fitting the housing element into the assembly opening; and joining the housing element to the housing blank by at least one welding method selected from the group consisting of: electron beam welding and laser beam welding, wherein the temperature (ΔT) is calculated according to the following formula:

$$\Delta T = \Delta D / (\alpha * D)$$

in which

α is a thermal expansion coefficient,

D is a diameter of the housing blank, and

ΔD is a difference in diameters between the housing blank and the housing element.

2. The method according to claim 1, wherein a housing blank with an at least substantially rotationally symmetrical, cylindrical or conical, geometry is provided.

3. The method according to claim 1, wherein the housing element is manufactured by at least one method selected from the group consisting of: machining, electrochemical machining (ECM), additive manufacturing methods, laser beam melting and/or electron beam melting.

4. The method according to claim 1, wherein the housing element is manufactured on and/or with a platform to be arranged in the assembly opening, wherein the platform has a wall thickness is equal to the wall thickness of the housing blank.

5. The method according to claim 1, wherein an assembly opening with an at least substantially circular or oval or polygonal geometry is produced in the housing blank.

6. The method according to claim 1, wherein the housing element is aligned by arranging it by at least one centering element relative to the assembly opening.

7. The method according to claim 1, wherein the assembly opening is produced by at least one separating method selected from the group: eroding, milling, and laser beam cutting.

8. The method according to claim 1, wherein the housing element includes at least one structural element selected from the group consisting of: flange, local thickened area, shoulder, through-guide, and/or stmt.

9. The method according to claim 1, wherein the turbomachine is a gas turbine.

10. The method according to claim 1, wherein a flange is thermally expanded, after which the flange is arranged on the housing blank and is shrunk fit onto the housing blank.

11. The method according to claim 10, wherein the rail and/or the flange are welded to the housing blank by a peripheral weld and/or a fillet weld and/or an I-butt and/or and I-seam.

12. The method according to claim 10, wherein at least one stop piece is manufactured on the housing blank, and the rail and/or the flange is/are aligned relative to the housing blank by this stop piece.

13. The method according to claim 12, wherein the stop piece is manufactured by milling, and/or is joined to the housing blank by welding and/or adhesive bonding.

* * * * *